United States Patent [19]

Aulakh

[11] Patent Number: 5,542,495
[45] Date of Patent: Aug. 6, 1996

[54] BRIDGE CLEANER AND PAINT/DEBRIS HOLDER APPARATUS

[76] Inventor: Hardev S. Aulakh, 9905 Georgetown Pike, Great Falls, Va. 22066

[21] Appl. No.: 328,047

[22] Filed: Oct. 24, 1994

[51] Int. Cl.⁶ ................................................. E04G 1/18
[52] U.S. Cl. ............................................ 182/63; 182/141
[58] Field of Search ........................... 182/63, 2, 141, 182/138

[56] References Cited

U.S. PATENT DOCUMENTS

| | | | |
|---|---|---|---|
| 3,161,259 | 12/1964 | Wilson | 182/141 |
| 3,191,717 | 6/1965 | Hiyama | 182/141 X |
| 3,407,836 | 10/1968 | Keiser | 280/43 |
| 3,485,321 | 12/1969 | Smith | 182/63 X |
| 3,632,153 | 1/1972 | Knudsen | 296/23 R |
| 4,041,974 | 8/1977 | Keiser | 137/344 |
| 4,137,994 | 2/1979 | Wood | 182/2 |
| 4,462,631 | 7/1984 | Lange | 296/160 |
| 4,887,860 | 12/1989 | Dowty | 296/26 |
| 4,958,874 | 9/1990 | Hegedus | 296/26 |
| 5,102,179 | 4/1992 | Royer | 296/26 |
| 5,280,985 | 7/1994 | Morris | 296/26 |
| 5,417,301 | 5/1995 | Wildner | 182/63 |

FOREIGN PATENT DOCUMENTS 4108045  4/1992  Japan ........................ 182/63

*Primary Examiner*—Alvin C. Chin-Shue
*Attorney, Agent, or Firm*—Brian S. Steinberger

[57] ABSTRACT

A mobile work and servicing platform trailer is disclosed. The platform trailer can include a roof section that is formed from a metal grate with openings therethrough. A first level of storage hoppers located beneath the roof section catch debris passing through the grates. Screw-augers located beneath the first level of storage hoppers can pass debris passing through spigots on the undersurface of these augers to troughs with screw-auger inside the troughs. Rotation of the screw auger causes the debris to move to other spigots which pass the debris to a second level of storage hoppers. The roof is vertically raisable from an initial low position to various heights. Winged side panels on the platform trailer rotate along hinges on opposite sides of the roof section. The outer edges of side-panels are raisable to the same height as the outer edges of the roof section and up to approximately thirty to forty degrees angled above the roof section. In the higher angled positions, the side-walls act as funnels to cause debris to fall by the force of gravity toward the grated roof deck and then into the hoppers below. The types of jacks capable raising both the roof and side panels can include hydraulic or pneumatic pistons and cylinders. A preferred use would be for supporting workers and equipment on the raised roof and side panels when servicing the sides and undersurfaces of bridges. Such servicing can be but is not limited to using the platform for fixing structural supports or maintenance items on the bridges such as when sandblasting and/or repainting these structures. The storage hoppers catch the sandblasted debris which are generally small size particles. These particles can later be filtered and sorted so that the same sand can be recycled and later reused for future sandblasting operations.

9 Claims, 7 Drawing Sheets

BRIDGE CLEANER AND PAINT/DEBRIS HOLDER APPARATUS

This invention relates to work support platforms, and in particular to a mobile scaffold platform that is useful for servicing and repairing bridges.

BACKGROUND AND PRIOR ART

Scaffolds have been used in the past to repair and service structures but have many problems. For example, many of these scaffolds am composed of materials such as wood and metal can only be used once. Thus, these scaffolds become unusable for future projects. Further, attempting to reuse scaffolds can be cumbersome because of the difficulty of transporting the material to various sites as well as the time required to assemble. Thus, traditional scaffolds add costly expenses to the overall repair project. For example, using the traditional scaffold structures as work platforms for repairs such as the sandblasting and painting of bridges can take several days.

Adapting the roofs of vehicles such as trucks and vans to be used as work support platforms are not practical for many reasons. Further, most roofs on trailers, trucks and vans are not strong enough to be capable of supporting workers and equipment. In fact, the potential weight of such workers and equipment could cause the roofs on conventional trailers to buckle and collapse. See U.S. Pat. No. 4,887,860 to Dowty.

Further, conventional trucks and vans do not provide space nor containers for adequately catching and storing debris particles that are the result of repair operations such as those caused from sandblasting bridge structures. Thus, current sandblasting operations require extra workers, time and related expense in order to adequately clean up bridge repairing worksites. Also, since no adequate methods are used for catching the used sand in a sandblasting operation, new sand must be used at all new sites.

Thus, the need exists for an improved system and method that avoids the problems mentioned above with prior art systems.

SUMMARY OF THE INVENTION

The first objective of the present invention is to provide a work and servicing platform that is capable of being reusable at various project sites The second object of this invention is to provide a work and servicing platform that is mobile.

The third object of this invention is to provide a work and servicing platform that is capable of supporting the weight of workers and equipment.

The fourth object of this invention is to provide a work and servicing platform that can be raised to desirable heights when needed.

The fifth object of this invention is to provide a work and servicing platform that can be raised in a short amount of time.

The sixth object of this invention is to provide a work and servicing platform that contains raisable and extendable wing sections for increasing the working surfaces.

The seventh object of this invention is to provide a work and servicing platform that can be put into operating condition and taken down for transportation to a new sight in less than one hour.

The eighth object of this invention is to provide a work and servicing platform with storage area to trap and catch debris material for future recycling.

A preferred use of this invention is for the servicing of the outer sides and underneath surfaces of large steel bridges that require the removal of old paint layers, recycling sandblasted steel grit, the fixing of structural components and the repainting operation thereof. This invention can be set up in approximately thirty(30) minutes and removed from a bridge operation in approximately twenty(20) minutes. With this invention, a bridge having one and half to approximately two lanes in width can be sandblasted and painted in one setting within one day, as compared to two to three settings that take approximately two to three days with present systems. The invention uses storage containers such as hoppers to catch sandblasted media such as steel grit that passes through a metal grate that makes up the roof deck of this invention. Debris passing through the grates of the roof deck pass to a first level of storage hoppers beneath the roof deck. Screw-augers can take the debris from the bottom of the first level of hoppers to pass into a second lower level of larger hoppers which sit toward the middle of the mobile trailer invention. The residue debris material stored in the large hopper can be recycled for future use.

Further objects and advantages of this invention will be apparent from the following detailed description of a presently preferred embodiment which is illustrated schematically in the accompanying drawings.

DESCRIPTION OF THE PREFERRED EMBODIMENT

Before explaining the disclosed embodiment of the present invention in detail it is to be understood that the invention is not limited in its application to the details of the particular arrangement shown since the invention is capable of other embodiments. Also, the terminology used herein is for the purpose of description and not of limitation.

Figure 1:
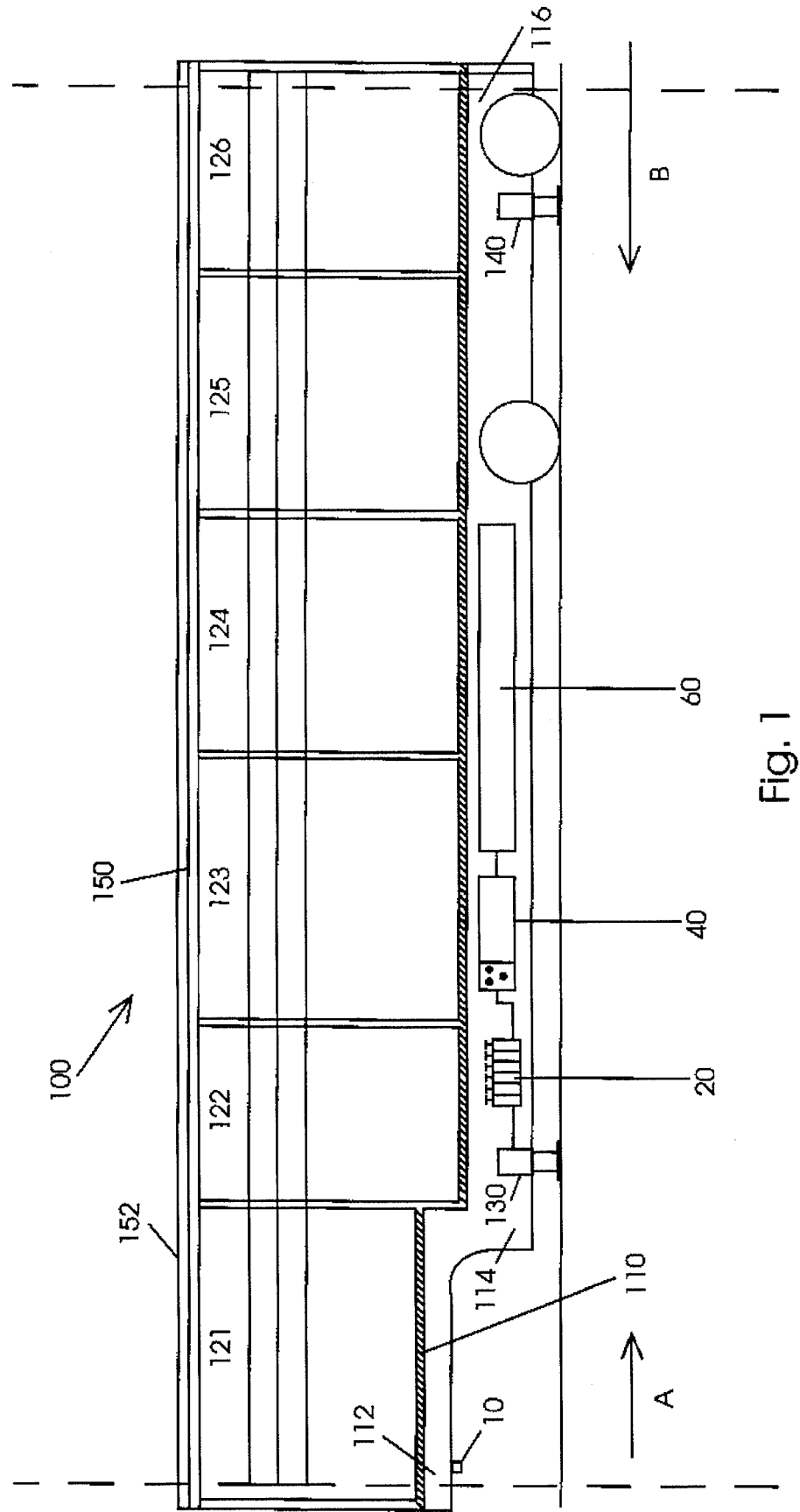
FIG. 1 illustrates a side view of the exterior of the preferred embodiment of the invention.

FIG. 1 illustrates a side view of the exterior of the preferred embodiment of the trailer invention 100 that modifies a tractor trailer such as the Lorry type trailer such as the one depicted in FIG. 1 of U.S. Pat. No. 4,958,874, and FIG. 1 of U.S. Pat. No. 4,887,860, which are incorporated by reference. A hitch attachment 10 can be used for attachment to typical trucks and tractors that are not shown. The modified trailer invention 100 includes an elongated floor layer 110 with a front end raised base section 112–114, and rear end base section 114–118, side-wall panels 121, 122, 123, 124, 125, 126 along the visible side are connected together to one another by such means as steel hangers, welding, or the like. The connected side-wall panels 121–126 form one side-wing approximately 8 feet high by approximately 50 feet long. A like number of side-wall panels on the opposing side of the trailer invention 100 are connected together in a similar manner. The elongated roof deck 150 can be formed from an approximately ¼ inch thick aluminum grating 152 that has mesh openings that are positioned over the open sides of storage hoppers 510–560(shown in clear detail in FIG. 6). The grating platform 152 acts as a sieve to allow residue media such as the used particles from repair operations such as those caused from sandblasting the undersurfaces of bridges, to pass through the grating 152 into hoppers 510–560. Conventional type stabilizing jacks 130 and 140, with respective conventional hydraulic controller 20, hydraulic pump-motor-starter 40 and hydraulic storage tank 60 are also shown in FIG. 1. The operation of leveling jacks 130, 140, 230 and 240 will be described in reference to FIGS. 2, 3 and 4, help to stabilize the novel trailer invention 100.

Figure 2:
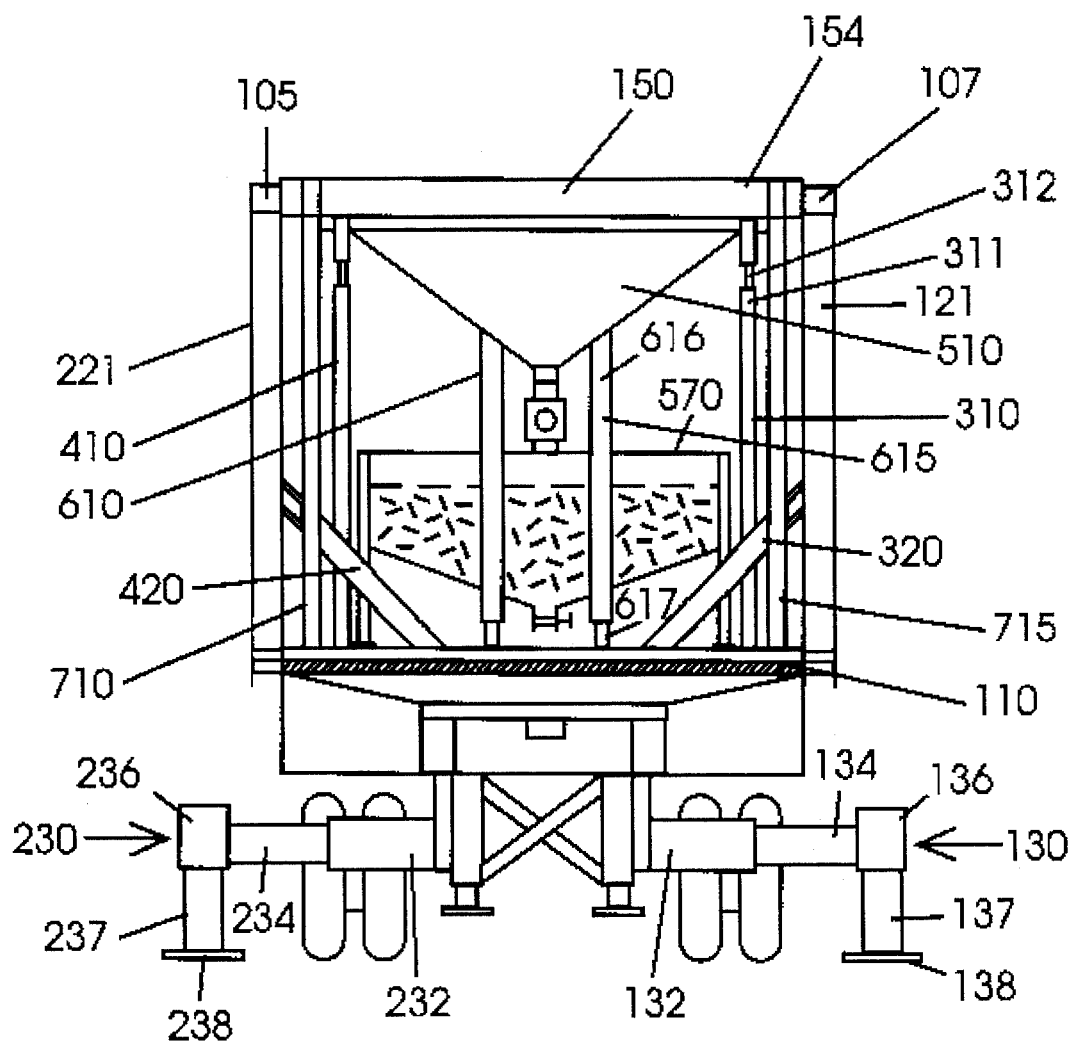
FIG. 2 illustrates a cut-away front view of the invention along arrow A of FIG. 1.

FIG. 2 illustrates a cut-away front view of the invention 100 along arrow A of FIG. 1. Stabilizing jack 130 includes a tube outrigger box 132, tube outrigger arm 134, tube jack housing 136, tube outrigger jack 137 and supporting base plate 138. The specific components of the stabilizing jack can be selected from material such as but not limited to steel, stainless steel, and the like. Jack 130 can be fluid driven by means such as but not limited to hydraulics 20, 40, 60(shown in FIG. 1 ) or pneumatically controlled. Opposite side stabilizing jack 230 is identical in operation to that of jack 130. During operation, jack housings 136, 236 are extended out from the sides of the trailer and tube outrigger jacks 137 and 237 are lowered until base plates 138 and 238 abut against the ground.

Referring to FIG. 2, hydraulic lift cylinders 310, 410 can be used to vertically raise roof deck area 150. Although, only two are shown approximately eight equally spaced cylinders can be used to vertically extend the roof 150. An example of the operation of a hydraulic lift cylinder is now described. Hydraulic cylinder 310 includes an outer cylindrical sleeve 311 connected at the base to floor 110 by welding and the like. Cylinder 310 includes an inner piston 312 fixably attached to roof grate 150 at connection point 154.

Figure 6:
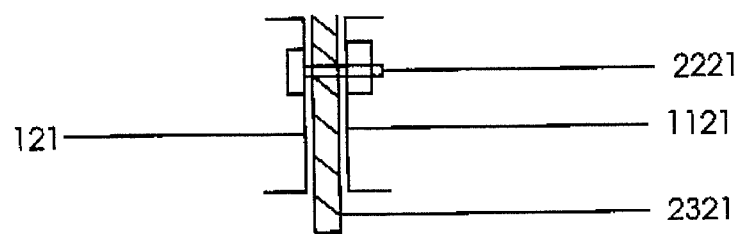
FIG. 6 shows a cross-section of a side-wing extension of the trailer invention.

Referring again to FIG. 2, the side edges of roof deck 150 can be connected to side panels 121, 221, respectively by steel hinges 105, 107, and the like. Side-panels 121,221 can each be composed of back-to-back six inch aluminum channels 121, 1121 bolted together with ½ inch stainless bolts 2221 and 1 inch steel spacer plates 2321, there between, as shown in FIG. 6.

Figure 3:
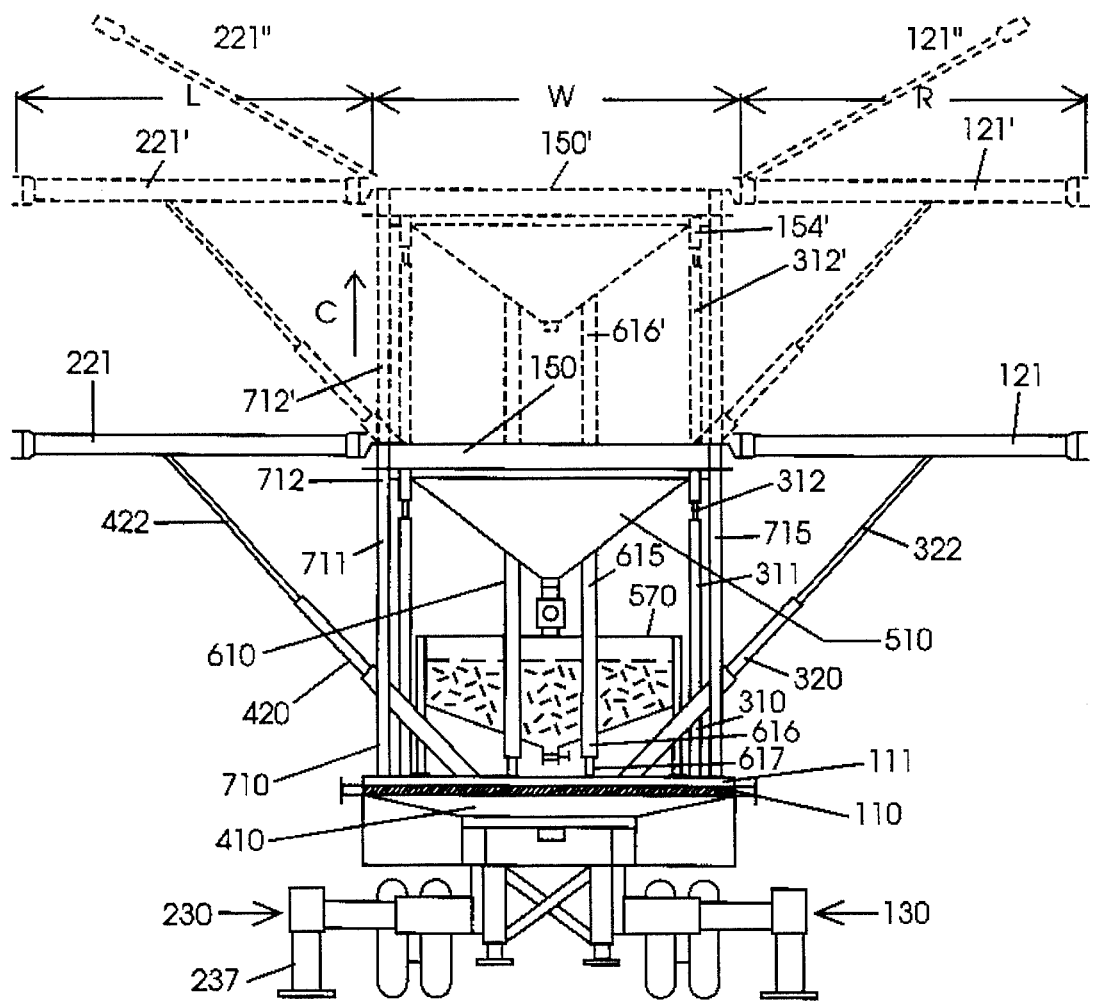
FIG. 3 illustrates a cut-away front view of FIG. 1 along arrow A, in extended positions.
Figure 7A:
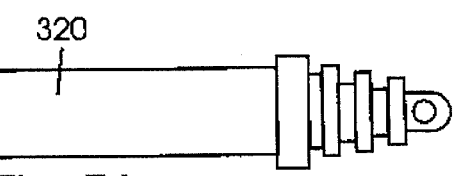
FIG. 7a and 7b show the contracted and extended position respectively, of a three-stage hydraulic cylinder used to extend the side-wings of the invention.
Figure 7B:
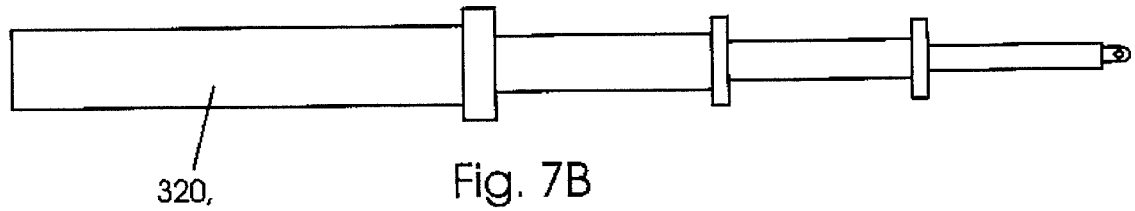

Referring to FIGS. 2 and 3, side-panels 121, 221 fold out to become side deck wing extensions using three stage hydraulic type cylinders 320 and 420, respectively. An enlarged view of one three stage cylinder is shown in a closed position 320 in FIG. 7A and in an extended position 320' in FIG. 7B.

Referring to FIGS. 2 and 3, element 510 refers to an approximately 7 foot wide hopper that is also approximately 8 feet 3 inches long whose upper surface can be attached to roof-deck 150 by welding soldering and the like. Element 570 refers to a larger lower positioned storage hopper whose operation will be described in better detail along with hopper 5 10, in reference to FIG. 5. Components 610, 615 of FIGS. 2 and 3, and 635, 690 of FIG. 4, each refer to inner steel tube deck support legs. Each of these inner legs operate similarly where an inner cylinder telescopes in relation to an outer concentric cylinder. For example, leg 615 includes an outer cylinder 616 whose top end is fixably connected by welding and the like to the under surface of roof-grate 150(as more clearly shown in FIG. 5). Referring to FIGS. 2 and 3, outside cylinder 616 includes an inner cylinder 617 whose bottom end is fixably connected by welding and the like to floor 110. Referring to FIG. 3, outer cylinder 616 extends to position 616' when roof deck 150 is raised.

Figure 4:
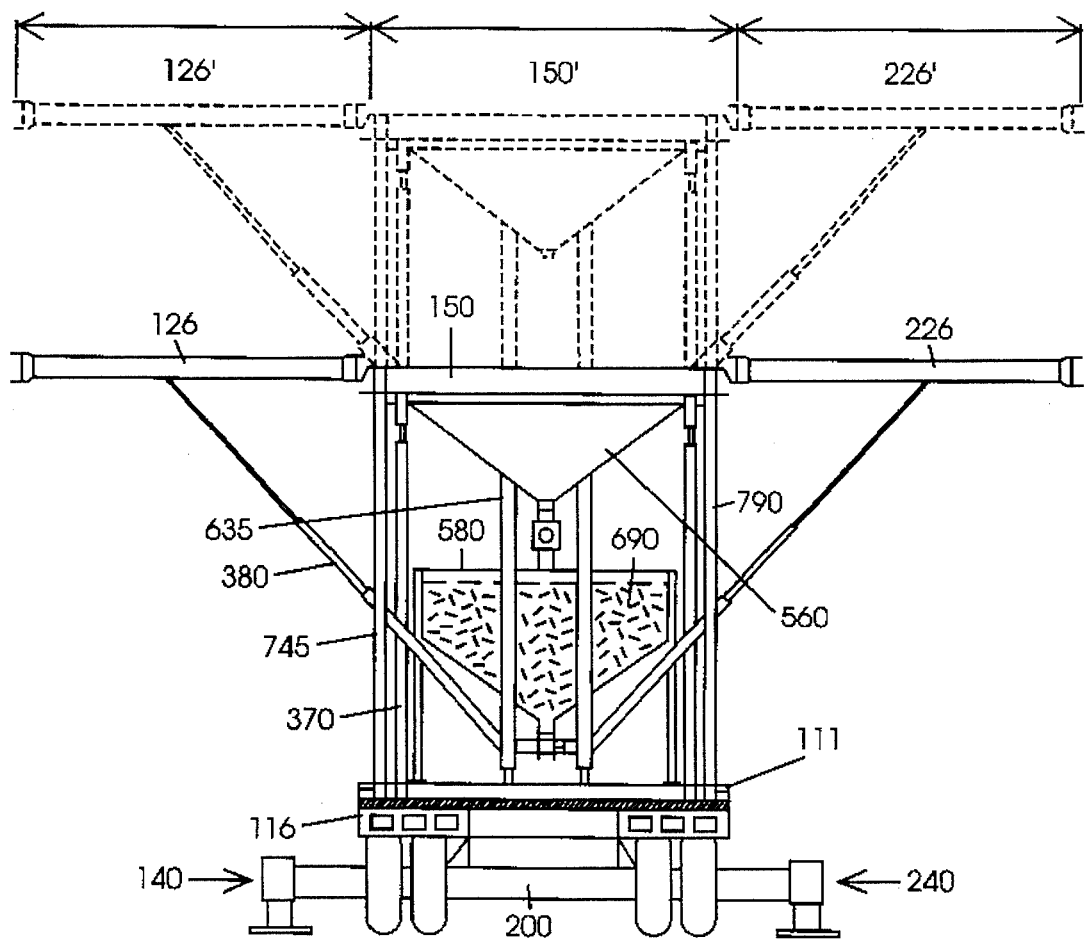
FIG. 4 illustrates a cut-away rear view of the invention along arrow B of FIG. 1, in extended positions.

Components 710, 715 of FIGS. 2 and 3 and 745, 790 of FIG. 4, each refer to outer steel tube deck support legs that each contain inner cylinders which also telescope in relation to outer concentric cylinders. These outer deck support legs operate in an opposite telescopic manner as compared to inner support legs 610, 615, 635, 690. For example, in reference to FIG. 3, outer support leg 710 includes an outer cylinder 711 whose lower end is attached by welding and the like to deck surface 110. Outer cylinder 711 includes an inner concentric cylinder 711 which has a top portion fixably attached by welding and the like to roof deck 150. When roof deck is raised to position 150', inner cylinder 712 extends to position 712'.

The operation of the side-wing walls 121, 221 of FIG. 2 will now be discussed in reference to FIG. 3. During use, hydraulic wing cylinders 320, 420 respectively extend pistons 322, 422 outward causing side-walls 126, 226 to pivot about pin hinges 105, 107 until the side-walls become adjacent and parallel to roof deck 150. Generally roof deck 150 has a width, w, of approximately 8 feet, 6 inches. Side-walls 121 and 221 can each extend the width of roof-deck 150 by approximately 8 feet each. Optionally the outer edges of side-walls can also be raised higher to position 121" and 221". In this last position the slanted upper surface area of the side-wings can direct residue debris to fall by gravity toward the grate-deck 150 and then into the storage hoppers 510 to 560.

Referring again to FIG. 3, vertical hydraulic cylinders 310, 410 are activated to vertically extend roof deck 150 upward along arrow C, until a desired height is reached as indicated by 121', 150', 221'. The vertical lift of deck 150 can rise approximately 6 feet above the normal height of the roof deck. For example, if the top of the roof is approximately 13 feet above ground level, the new height can be up to 19 feet above ground level.

Operators of the invention can alternatively raise the original roof deck 150 by itself, or raise the roof deck and one side-wall, or raise the roof deck while simultaneously raising both sidewalls. Further, the operator can just raise the side-walls to increase the surface work area without vertically raising the roof.

FIG. 4 illustrates a cut-away rear view of the invention along arrow B of FIG. 1, in extended positions. The components appearing in FIG. 4 operate in the same way as the similarly located components in FIGS. 2 and 3. Component 200 refers to a steel tube outrigger box for attaching stabilizing jacks 140 and 240 together which operate in a like manner to jacks 130 and 230 if FIGS. 1 and 2. Optional component 111 refers to a supplemental steel angled base plate that extends along the entire surface of floor 110, where legs 710, 715, 720, 725, 730, 735, 740 and 745 are welded. Optional component 111 can be bolted and welded to wailer floor 110. Element 580 refers to a larger storage hopper whose operation will be described in better detail along with hopper 560, in reference to FIG. 5.

Figure 5:
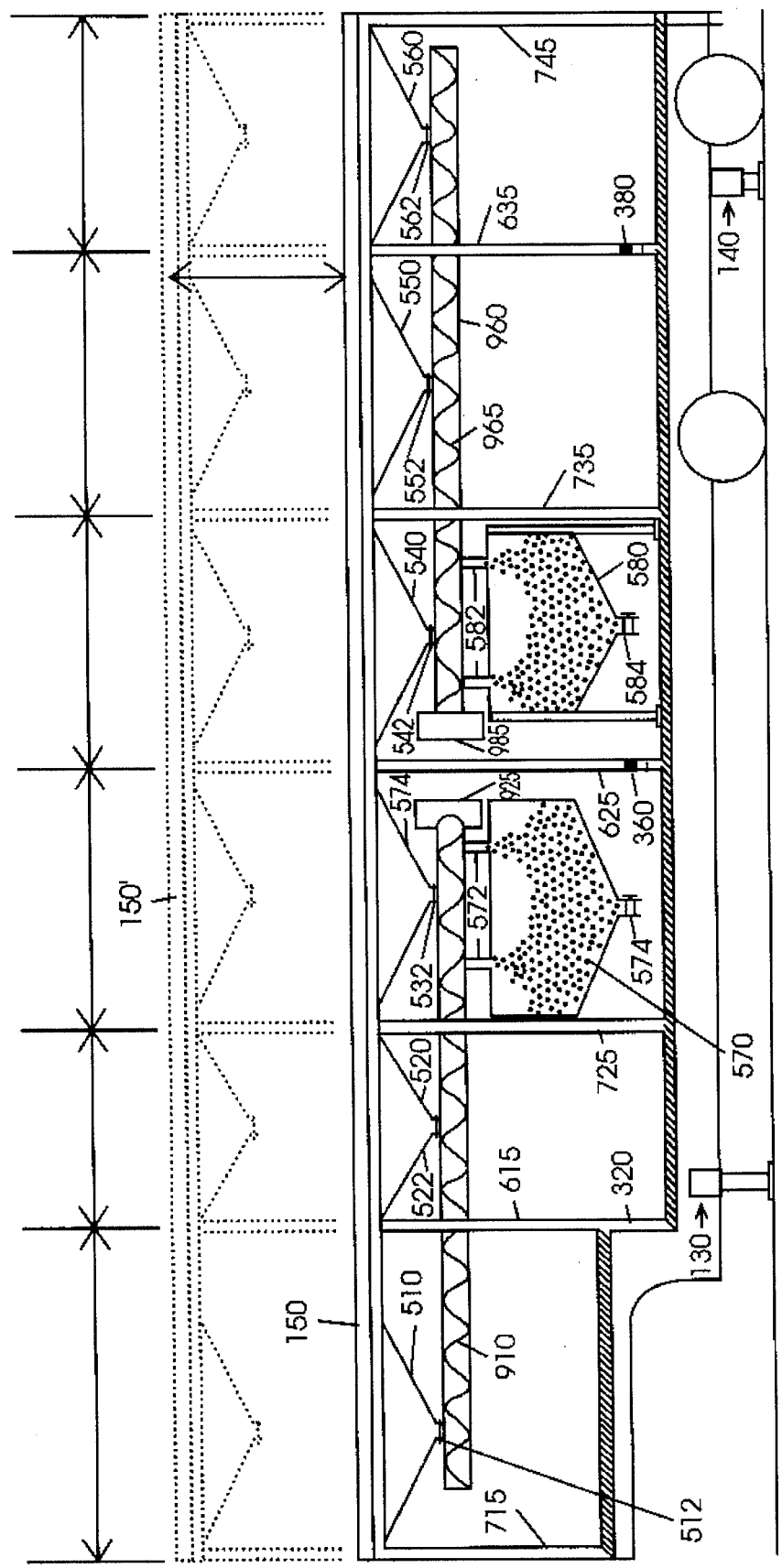
FIG. 5 illustrates the invention of FIG. 1, in extended positions.

Referring to FIG. 5, upper portions of hoppers 510–560 can be welded to the undersurface of grating 152. The residue grit such as sandblasted material passes from hoppers 510–560 through their respective neck type spigot openings 512–562 to conveyers 910, 960 such as oppositely rotating motorized metal screw augers 915, 965 transport the grit to open spigots 572, 582 that pass the grit by gravity to steel storage hoppers 570, 580. Conveyors 910, 960 can be powered by motors 925, 985 such as hydraulic, electrical and the like. The grit can be stored in containers 570, 580 and later released respectively through controlled spigots 574 and 584.

Figure 8:
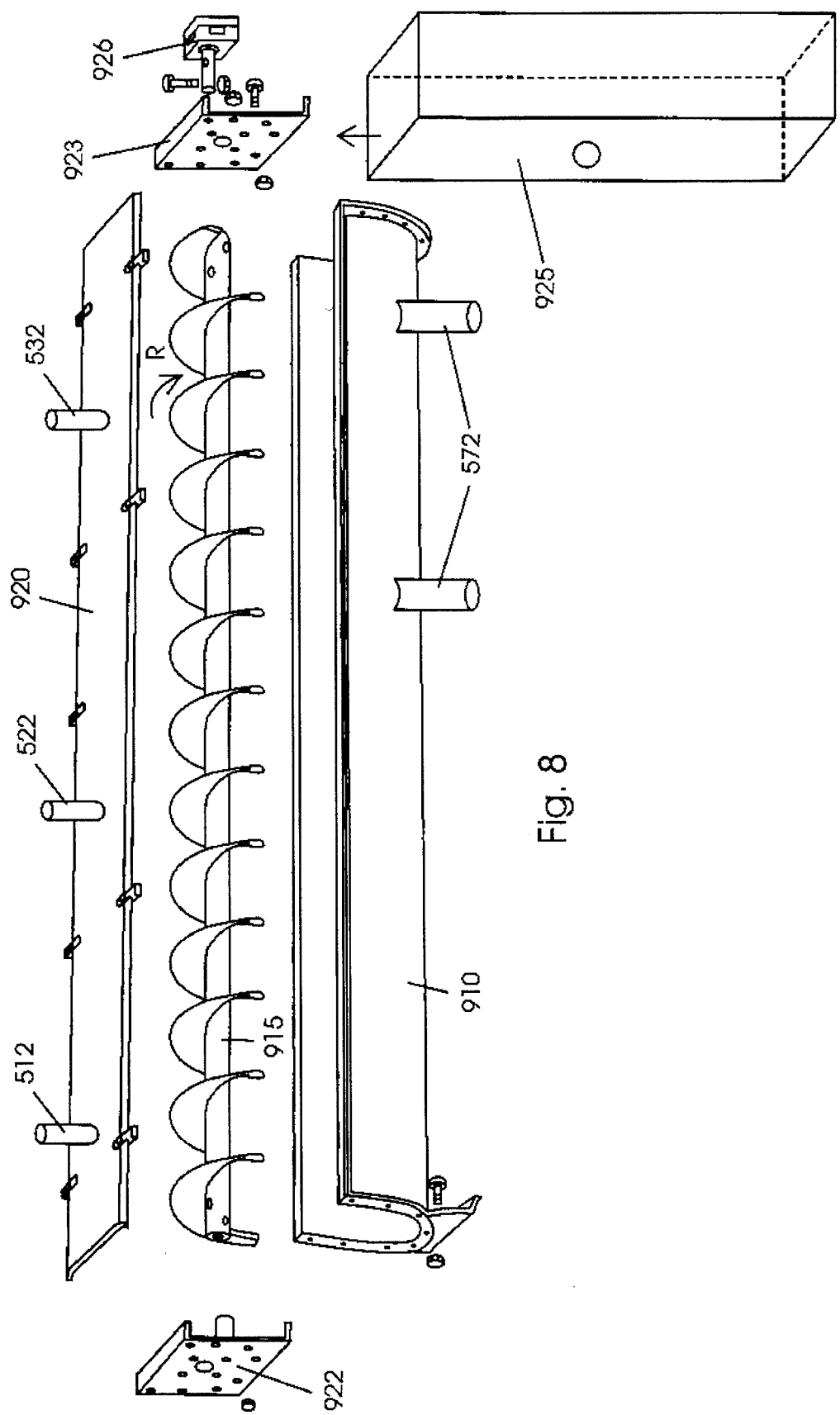
FIG. 8 shows an exploded side view of the screw/auger conveyer used in the invention of FIG. 5.

FIG. 8 shows an exploded side view of one of the oppositely rotating motorized metal screw augers 915, 965. Such a screw auger 915 can be modified from a conventional one manufactured from the FMC Corporation, Material Handling Equipment Division, of Homer, Penn., that is entitled the "Link-Belt Quick-Line" screw conveyer. Referring to FIG. 8, spigots 512, 522, 532 receive residue material from respective storage hoppers 510, 520 and 530. Cover 920 encloses a screw auger 915 inside a trough 910, with end plates 922, 923 holding ends of auger 915 in place. Motor 926 such but not limited to hydraulic, pneumatic or electric, rotates the auger in the direction of arrow R causing residue to move toward outgoing spigots 572. Housing 925 contains the motor 926, endplate 923 and related components.

A preferred use of this invention is for the servicing of the outer sides and underneath surfaces of large steel bridges that require the removal of old paint layers, the fixing of structural components and the repainting operation thereof. Other uses for the invention are not to be limited by this preferred use environment but instead the invention can be adapted for any such use where a mobile platform with these attributes can be needed.

Although the preferred embodiment as been described as a type of trailer device, the invention can have utility for both permanent or detachable attachment with other types of vehicles such as but not limited to trucks, tractors, vans, railroad cars and the like.

Although, the embodiment describes primarily using hydraulic cylinders and pistons, pneumatic cylinder/pistons and also be used.

Although the figures of the preferred embodiment show the front and rear views of the invention are open-ended, these ends can be closed with doors and the like to allow the invention to be used as a storage container for storing and carrying tools, supplies, materials and such to job sights when the invention is not in operation.

Although, a preferred embodiment of the invention has been described with various dimensions, the invention can be modified for the needs of specific applications.

While the invention has been described, disclosed, illustrated and shown in various terms of certain embodiments or modifications which it has presumed in practice, the scope of the invention is not intended to be, nor should it be deemed to be, limited thereby and such other modifications or embodiments as may be suggested by the teachings herein are particularly reserved especially as they fall within the breadth and scope of the claims here appended.

I claim:

1. A raisable rectangular vehicle for supporting workers and equipment when servicing understructures comprising:

a rectangular vehicle body with wheels, the vehicle body selected from one of:

a trailer, a truck, and a van;

an elongated floor attached to the vehicle body;

an elongated roof parallel to and located above the elongated floor to create an open space, the roof capable of supporting the weight of workers and equipment, the elongated roof having a grate surface with openings for allowing debris to pass therethrough;

a vertical jacking means for vertically raising the roof to a second position substantially parallel to the floor;

elongated side walls parallel to one another and located about the periphery of the vehicle body for substantially closing off opposite sides of the open space, each side wall having a top end and a bottom end, and at least one side wall capable of supporting the weight of workers and equipment;

an angled jacking means for raising the bottom end of at least one side wall to the same height as the top end of the one side wall;

a first container located beneath the grate surface for receiving the debris from above the grate surface; and a screw-auger within the vehicle body for passing the debris from the first container to a second container within the vehicle body, wherein the elongated roof and the elongated side walls are raisable within a short time for servicing an understructure.

2. The raisable rectangular vehicle of claim 1, further comprising:

stabilizing means for fixably supporting the vehicle body to ground.

3. The raisable rectangular vehicle of claim 1, wherein the vertical jacking means is selected from at least one of:

a hydraulic piston, a pneumatic piston or an electrical cylinder.

4. The raisable rectangular vehicle of claim 1, wherein the angled jacking means is selected from at least one of:

a hydraulic cylinder, a pneumatic piston or an electrical cylinder.

5. The raisable rectangular vehicle of claim 1, wherein the top end of at least one side wall includes:

a pin hinge for attaching the top end of the at least one raisable side wall to an edge on the elongated roof.

6. The raisable rectangular vehicle of claim 1, wherein the understructure includes: a bridge.

7. The raisable rectangular vehicle of claim 1, wherein the short time includes: approximately thirty minutes or less.

8. The raisable rectangular vehicle of claim 1, wherein the equipment includes: sandblasting equipment.

9. A raisable rectangular trailer having a raisable roof and raisable sidewalls for supporting workers and equipment when servicing bridges comprising:

a rectangular trailer body with wheels;

an elongated floor attached to the trailer body;

the raisable roof comprising an elongated roof parallel to and located above the elongated floor to create an open space, the roof capable of supporting the weight of workers and sandblasting equipment, the elongated roof having a grate surface with openings for allowing debris to pass therethrough;

a vertical jacking means for vertically raising the roof to a second position substantially parallel to the floor;

elongated side walls parallel to one another and located about the periphery of the trailer body for substantially closing off opposite sides of the open space, each side wall having a top end and a bottom end, and at least one side wall capable of supporting the weight of the workers and the sandblasting equipment;

an angled jacking means for raising the bottom end of at least one side wall to the same height as the top end of the one side wall;

a first container inside and beneath the grate roof surface for receiving the debris from above the grate roof surface; and a screw-auger for passing the debris from the first container to a second container within the trailer body, wherein the elongated roof and the elongated side walls are raisable within approximately thirty minutes or less for servicing a bridge structure.

* * * * *